UNITED STATES PATENT OFFICE.

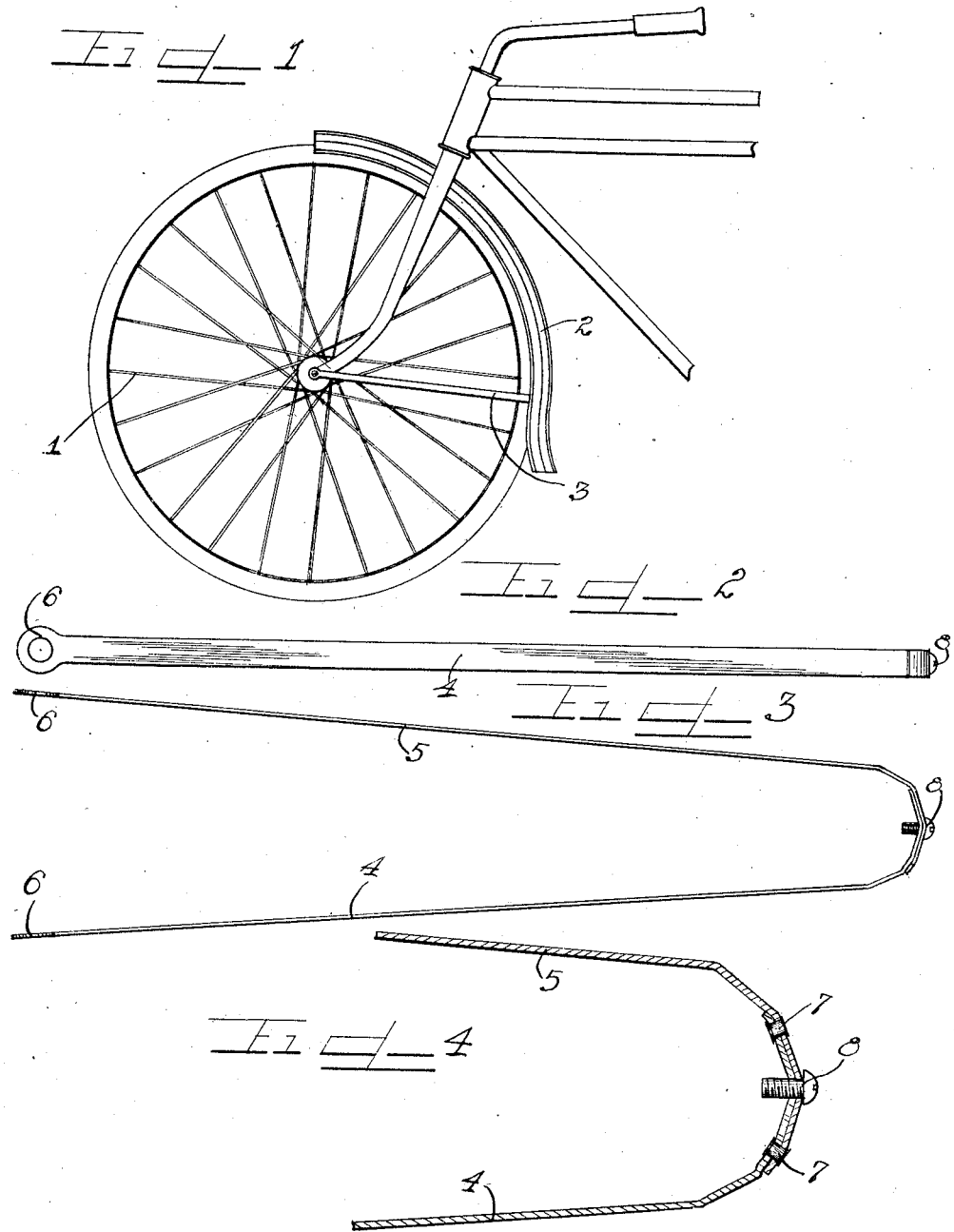

WALTER R. GREEN, OF CHICAGO, ILLINOIS.

MUD-GUARD BRACE.

1,352,596.  Specification of Letters Patent.  Patented Sept. 14, 1920.

Application filed July 21, 1917. Serial No. 181,948.

*To all whom it may concern:*

Be it known that I, WALTER R. GREEN, a citizen of the United States, and a resident of the city of Chicago, in the county of Cook and State of Illinois, have invented certain new and useful Improvements in Mud-Guard Braces; and I do hereby declare that the following is a full, clear, and exact description of the same, reference being had to the accompanying drawings, and to the numerals of reference marked thereon, which form a part of this specification.

Mud guard braces as heretofore constructed have been objectionable in that they were constructed of too numerous parts and the brace at the point of attachment to the mud guard has been too weak, often breaking and not affording sufficient thickness to properly attach the same.

It is an object of this invention to provide a mud guard brace made of two bars or stampings which have their maximum strength at the place of attachment to the mud guard to thereby prevent breakage at this point and to strengthen the mud guard as a whole.

Other and further important objects of this invention will be apparent from the disclosures in the specification and drawings.

The invention (in a preferred form) is illustrated in the drawings and hereinafter more fully described.

On the drawings:

Figure 1 is a fragmentary detail of the front wheel of a bicycle provided with a mud guard brace embodying my invention.

Fig. 2 is a side view of the brace.

Fig. 3 is an edge view thereof.

Fig. 4 is a fragmentary central section taken through the brace.

As shown in the drawings:

1, indicates the wheel of a bicycle or motorcycle and 2, a mud guard for the front wheel. The brace, indicated as a whole by the reference numeral 3, in Fig. 1, comprises two complemental sections 4—5, each stamped from a sheet of metal and provided on the outer ends with eyes 6, to receive the ends of the axle for the wheel therethrough. The opposite ends of the sections are complementally shaped and fitted together with one end overlapping the other providing two thicknesses of metal and rigidly secured together by means of brazing or rivets 7. Said thickened wall is provided with a threaded aperture to receive the screw or bolt 8, for attaching the brace to the mud guard. The mud guard, when completed, forms a continuous mud guard with outwardly diverging resilient arms connected by a reinforced arched portion.

The operation of the device is readily seen. By the construction shown, only two parts are necessary, and these are complemental and standardized. The brace, when finished, comprises a continuous brace with the strongest part thereof at the place of attachment to the mud guard, and owing to the double thickness of metal at this point, sufficient metal is provided to make strong screw threads for the attaching bolts. The shape of the braces at the outer arched ends is such that when fitted and secured together, they conform to the cross-section of the particular mud guard to which they are desired to be attached.

I therefore do not desire to limit myself to the particular semi-octagonal shape of the arch, as this may be of any shape to conform to the cross-section of the mud guard. The construction is such that when the diverging arms are sprung onto the attaching bolt or axle of the wheel, a strong bracing effect is provided for the mud guard. Of course, if desired, instead of the attaching bolt 8, a rivet or other means may be used for attaching the mud guard to the brace, or they may be braced together.

I am aware that various details of construction may be varied through a wide range without departing from the principles of this invention, and I therefore do not desire to limit the patent granted otherwise than necessitated by the prior art.

I claim as my invention:

1. The combination with a mud guard having portions bent angularly to one another transversely of the width of the mud guard, and a supporting brace therefor comprising a pair of flat strips each having attaching means at one end, and a portion at the other end overlapping the corresponding portion of the other strip, said overlapping portions being correspondingly angularly formed to fit inside the mud guard and provide a doubled portion at the place of attachment to the mud guard.

2. The combination with a transversely concaved mud guard of a brace therefor comprising a pair of arms each having a flat end overlapping and bent to fit the corresponding end of the other arm inside the mud guard and means engaging the overlapping portions of the arms for securing the mud guard to the brace, said arms being provided with attaching means at their other ends.

In testimony whereof I have hereunto subscribed my name in the presence of two subscribing witnesses.

WALTER R. GREEN.

Witnesses:
 CHARLES W. HILLS, Jr.,
 EARL M. HARDINE.